United States Patent
Buda et al.

[11] Patent Number: 5,963,022
[45] Date of Patent: Oct. 5, 1999

[54] METHOD AND APPARATUS FOR COMPENSATING PHASE DISTORTION CAUSED BY A HIGH IMPEDANCE VOLTAGE SOURCE

[75] Inventors: Paul R. Buda; Jonathan H. Bailey, both of Raleigh, N.C.

[73] Assignee: Square D Company, Palatine, Ill.

[21] Appl. No.: 08/869,626

[22] Filed: Jun. 5, 1997

[51] Int. Cl.$^6$ ........................................ G05F 7/00
[52] U.S. Cl. ...................... 323/212; 219/110; 219/130.1; 323/246
[58] Field of Search ..................... 323/217, 207, 323/239, 241, 246; 219/110, 124.02, 130.33, 130.1; 364/477.06

[56] References Cited

U.S. PATENT DOCUMENTS

| | | | |
|---|---|---|---|
| 4,493,040 | 1/1985 | Vanderhelst | 219/110 |
| 4,634,830 | 1/1987 | Furudate | 219/110 |
| 4,821,202 | 4/1989 | Davis et al. | 219/124.02 |
| 4,945,201 | 7/1990 | Ito et al. | 219/110 |
| 5,450,315 | 9/1995 | Stefanski | 219/110 |

*Primary Examiner*—Shawn Riley
*Attorney, Agent, or Firm*—Michael J. Femal; Larry I. Golden

[57] ABSTRACT

A phase control system has a stable timebase phase reference generated by an internal phase reference generator. The control includes a method for estimating and compensating phase distortion when an inductive load is driven by an AC voltage source having significant line impedance. A digital phase comparator estimates a phase error between the timebase phase reference and the voltage source. At the initialization of the phase control system, the phase reference clock period is frozen for a fixed number of cycles to determine an average phase error due to the phase distortion caused by the line impedance. The estimated phase error is then corrected to account for the average phase distortion error.

19 Claims, 9 Drawing Sheets

METHOD AND APPARATUS FOR COMPENSATING PHASE DISTORTION CAUSED BY A HIGH IMPEDANCE VOLTAGE SOURCE

RELATED APPLICATIONS

This application is related to the following, commonly assigned applications filed concurrently herewith, entitled "Phase Distortion Compensated Timebase For A Welder Control System" (application Ser. No. 08/866,828, Applicants Docket No. RLA-25) and "A Method And Apparatus For Estimating a Phase Error Between Two Independent Timebases" (application Ser. No. 08/866,875, Applicants Docket No. RLA-26). The contents of these Applications are expressly incorporated herein by reference.

DESCRIPTION

1. Technical Field

Applicants' invention relates generally to the field of phase angle firing controllers having an internal reference timebase which is used to provide a reference for the phase angle firing control and more particularly to a method and apparatus for estimating and compensating for phase distortion when an inductive load is driven by an AC voltage source having significant line impedance.

2. Background Art

Resistance welding is now widely used in most applications requiring the joining of metals, such as the steel used in the manufacturing of automobiles. With the advent of the microprocessor, weld controllers have become more sophisticated and use a variety of control techniques to ensure the quality of welds throughout the life of the contact tips as they wear out. Regardless of the process or control technique used, most weld controllers consist of several basic components. These include a weld control module, a power module, a weld transformer and the contact tips. The power module usually consists of power semiconductors such as silicon controlled rectifiers (SCRs) that switch incoming power to the weld transformer according to a preset weld program as generated by the control module. The weld transformer will transform the incoming power to a high current pulse that is coupled to the contact tips to create a weld to a workpiece that is between the contact tips. The weld control module is usually microprocessor based.

The preset weld program will use phase angle control to switch the power modules. In order to achieve accurate repeatability of the proper phase angle to fire the SCRs, a stable timebase reference is required. This timebase should be immune to the electrical noise generated by other equipment that may be coupled to the power source. The voltage source may have significant line impedance relative to the generally high currents involved with weld controllers. This will cause phase distortion in the incoming voltage that will effect the timebase reference, which, in turn, will cause the SCRs to switch at a different phase angle than the desired angle. Some type of phase distortion compensation is required to ensure that this not occur.

The traditional approach to generating a time base involves measuring the zero crossings of the voltage waveform directly, either by sampling the polarity of the input voltage waveform on a regular basis and determining where in time the input voltage waveform transitions from one polarity to another, or by developing circuitry which determines the zero crossing of the waveform and generating an interrupt to the microprocessor in response to the zero crossings. The electronic circuitry which accomplishes this is commonly referred to as a phase discriminator, and usually involves heavily amplifying the line voltage and clipping the result. The transitions of the resulting waveform are assumed to coincide with the zero crossings of the assumed sinusoid. However, line voltages in automotive welding applications are rarely pure sinusoids, as equipment drawing current from the weld bus can corrupt the line voltage, injecting noise and other distortion which severely limits the reliability of this traditional approach. As an example, weld applications in which weld transformers with full wave rectified secondaries are utilized can cause multiple zero crossings of the observed line voltage in the vicinity of the actual zero crossings of the sinusoid as generated by the power company. Additionally, the presence of line impedance causes the apparent phase of the weld voltage as seen by the weld controller to shift while welding. The impedance of the weld bus, comprising bus fusing, interconnecting wiring and other impedances affect the voltage which appears at the sensing terminals of the weld controller. It is this voltage which is sensed by the weld control electronics and used to derive the phase reference signals which form the basis for firing the solid state weld contactor. In the absence of current flow, it is identical to the bus voltage, but when the weld control switches current to the load, significant harmonic distortion can result which, without detection and appropriate compensation, can result in a degradation of the transient response of the weld control, and can cause the weld control to make errors in estimation of the load power factor. The problem is further complicated in that the weld controller does not apply current continuously, but rather switches current on and off during the cycle. The result is that the amount of phase distortion incurred at the weld control relative to the bus voltage source is dependent not only upon the line and load impedance, but also on the firing angle employed. Zero crossing based phase reference generators significantly limit the performance of the weld control in terms of noise immunity and transient response.

An early type of a phase reference generator which improves upon the traditional phase discriminator approach above is disclosed in U.S. Pat. No. 4,301,351 which describes an approach for developing a timing reference based on integrating the line voltage to develop a signal proportional to the volt-time area of the waveform. The voltage is sampled four times per nominal period of an internal phase reference. A signal indicative of a change in frequency or phase is generated by taking the difference between the volt-time area of two quarter cycles. In the actual implementation of this patent, all four samples of a line voltage cycle are used to develop an indication of an error in phase between the internal time base and the input line voltage. Errors are estimated based on the previous cycle of line voltage which is then used to compute a correction to the internal phase clock, which is then applied to the next cycle of line voltage. In the specification of the patent, it is indicated that this approach has the advantage of ignoring spurious noise generated on the actual power system by other equipment such as motors and other weld controls. Whereas this integral approach offered significant improvement over the more traditional derivative approach in the presence of a noisy weld bus, as it did not rely on the zero crossing directly to generate the internal phase reference, no attempt was made to quantify the phase error so conventional feedback control techniques available to persons skilled in the art could be employed. Also, the transport lag inherent in this approach due to the number of samples required resulted in the correction occurring in the next cycle, which limited the effectiveness of the approach. Furthermore, the approach described in U.S. Pat. No. 4,301, 351 did not provide for any estimate of, or compensation for, the phase distortion inflicted upon the observed line voltage due to the weld process, which is of a more repetitive nature. It would be desirable to develop a system or method whereby this time lag is reduced and the effect of phase distortion can be compensated, resulting in an internal phase reference which more accurately tracks the actual voltage source, rather than the distorted voltage signal observed by the weld control.

SUMMARY OF THE INVENTION

Accordingly, the principal object of the present invention is to provide a stable timebase phase reference for a phase controlled weld controller system, supplied by a voltage source which is immune to spurious noise generated by other external equipment coupled to the voltage source.

Another object of the present invention is to provide a stable timebase phase reference for a phase controlled weld controller system supplied by a voltage source, iresulting in an improved transient response for the weld controller system.

Yet another objective of the invention is to provide a method and apparatus for estimating the phase distortion generated by firing a weld control into an inductive impedance load when significant line impedance is present.

Still a further objective of the invention is to provide a method and apparatus for compensating for the phase distortion in the phase reference using the estimated line impedance to realize a phase reference which more accurately tracks the voltage source.

In the preferred embodiment of the invention, the invention is comprised of a system of essential elements including, but not limited to, a weld control module, a power module, a weld transformer and contact tips for each phase of the poly phase voltage source. The power module consists of power semiconductors such as silicon controlled rectifiers (SCRs) or thyristors that switch incoming power to the weld transformer according to a preset program as generated by the control module. The weld transformer will transform the incoming power to a high current pulse that is coupled to the contact tips to create a weld to a workpiece that is between the contact tips. Included in the weld control module is a phase reference generator which is a discrete time, time varying feedback control loop which reads the values of a Volt-Time area developed by a digital voltmeter. Two samples of the input volt-time area per assumed cycle of line voltage are used to compute the phase error. This allows the system to compute a phase error based on the present cycle which can then be used to correct the next cycle, thereby eliminating the time lag inherent in U.S. Pat. No. 4,301,351.

A digital phase comparator estimates the error in phase between the input voltage source and an internal phase reference clock. The phase error is constructed using the normalized difference between the volt-time area between two adjacent quadrants of the internal phase reference clock. When welding begins, the phase reference clock period is frozen for a fixed number of cycles and the resulting error due to phase distortion is estimated. The phase error estimate is then corrected to account for the phase distortion.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
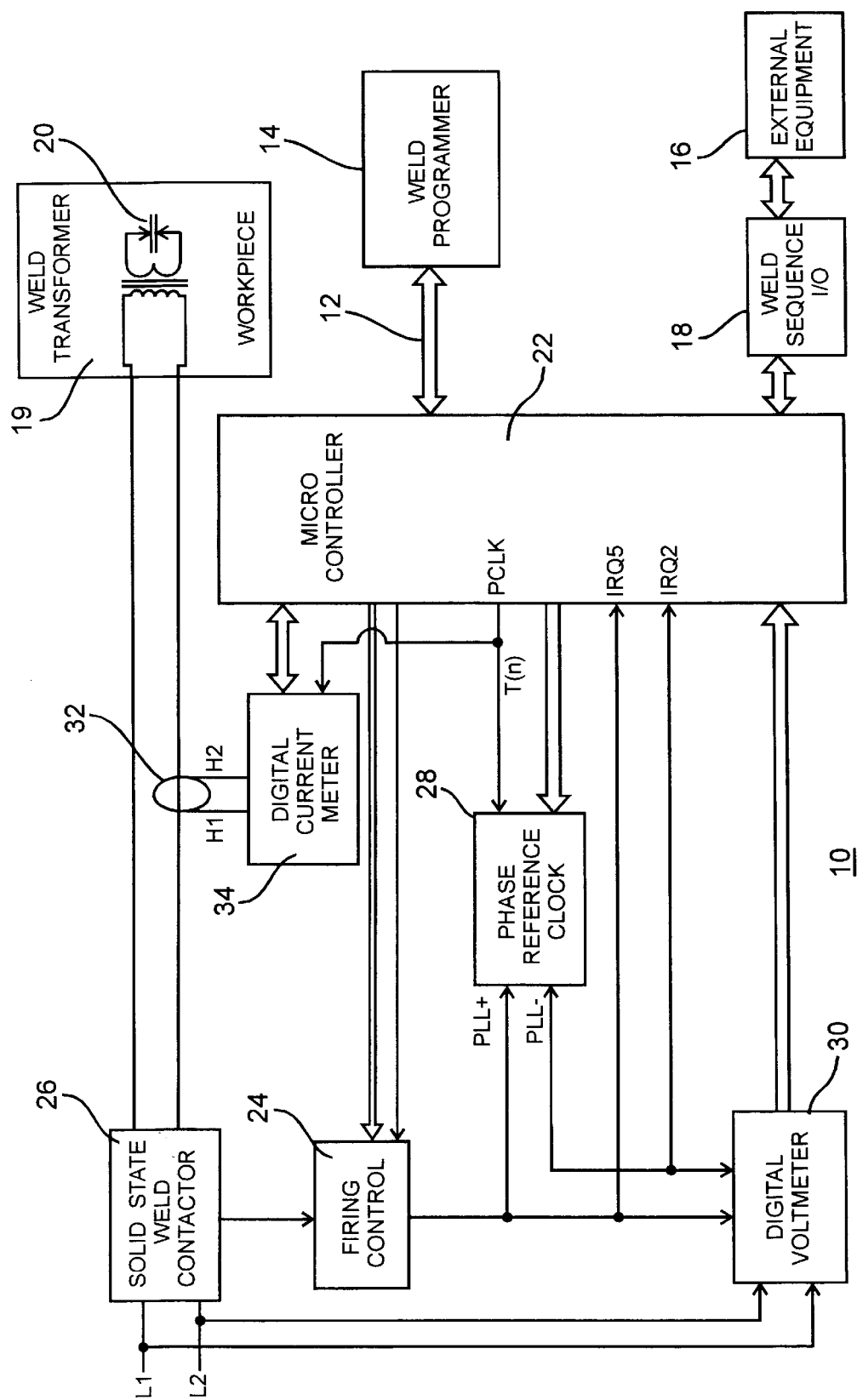
FIG. 1 shows an overview block diagram of a basic weld controller of the present invention.

FIG. 1 shows an overview block diagram of a basic weld controller 10. A source of weld power is connected to the weld controller via the input lines L1 and L2. The weld controller is programmed via a serial communication link 12 tied to a weld programmer 14, external to the weld controller 10. Once programmed, the weld controller 10 is sequenced through its operations via external equipment 16, which is wired to a weld sequence I/O 18. The output of the weld controller 10 is wired to a weld transformer 19 and gun 20, which passes current through a workpiece comprising two or more pieces of metal that are to be joined.

Internally, the weld controller 10 also includes a microcontroller 22, a firing control module 24, a solid state weld contactor 26 and a phase reference clock 28. Digital voltage meter 30 is used to measure various parameters of the input line voltage L1–L2, such as volt-time area, and polarity. A current sensor 32 generates a current signal H1, H2 proportional to the current flowing in the primary of the weld transformer 20. A digital current meter 34 is used to measure various parameters of the primary load current, such as current-time area, polarity, and conduction time.

The microcontroller 22 consists of a microprocessor, associated program and data memory, and a time base reference source such as a crystal controlled clock. The microcontroller 22 is the functional brain of the weld controller 10 and interacts with all of the other functions to generate the appropriate timing signals to fire the solid state weld contactor 26 through the firing control module 24, which is synchronized with the phase reference clock 28 under software control. The solid state weld contactor switches line voltage upon command in the form of firing pulses from the firing controller. This contactor generally comprises a pair of back to back thyristors with associated snubbing, level shifting and pulse shaping circuits required to accept the firing pulses. The weld sequence I/O 18 may take the form of hard-wired digital inputs and outputs, or one of several serial communication interfaces per various commercial standards, for receiving various weld commands and sequences.

Figure 2:
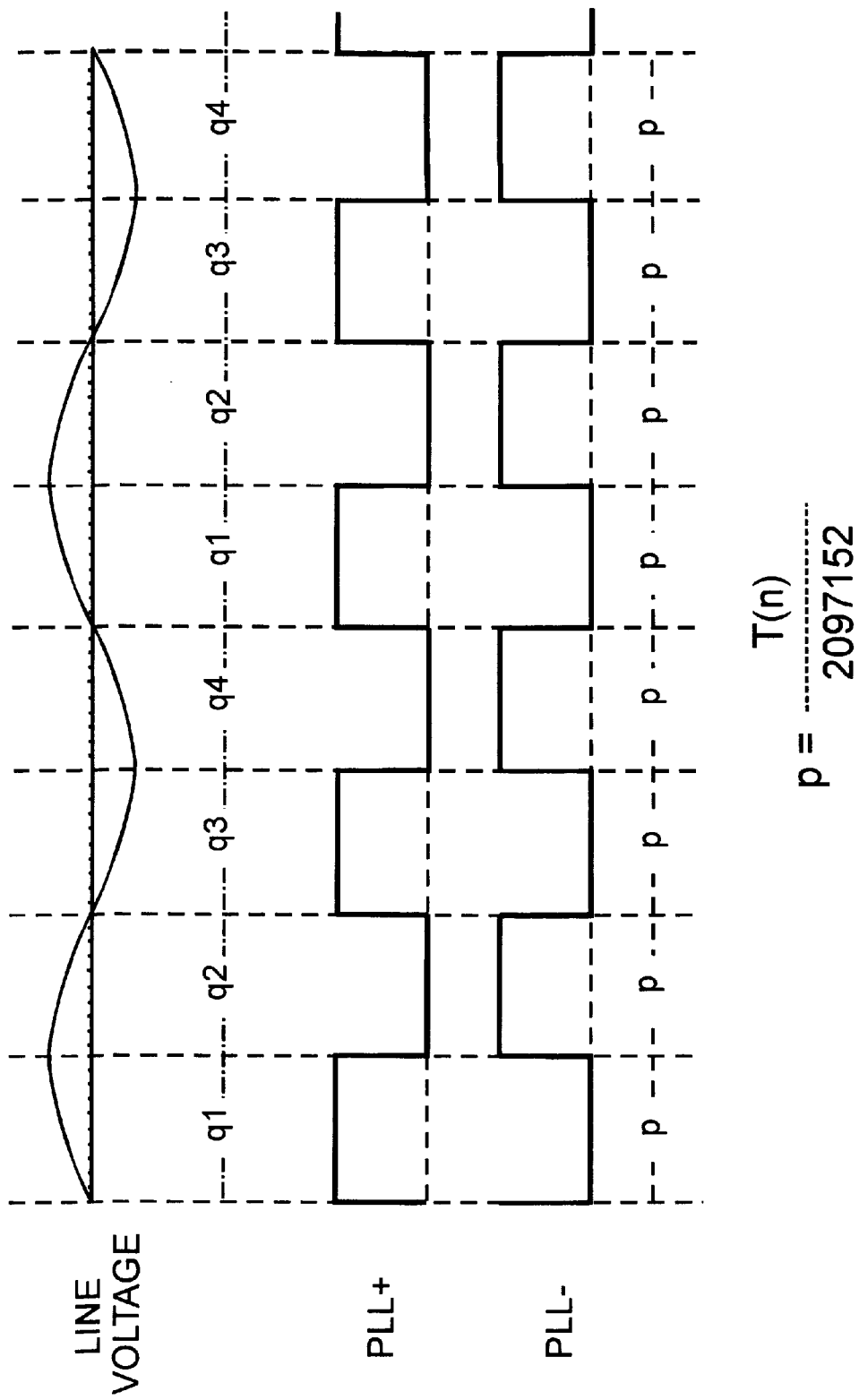
FIG. 2 shows timing relationships between an input line voltage waveform and the signals PLL+, PLL− used to control a solid contactor supplying weld power to a weld workpiece.

The phase reference clock 28 is a free-running clock which operates independent of software delays. The period of the phase reference clock can be set and modified under software control. In the preferred embodiment, the phase reference clock is implemented in hardware external to the microcontroller 22, utilizing a commonly available programmable counter. The clock could also be implemented using a clock circuit residing internal to the microprocessor. The counter is driven by the microprocessor system clock, which operates at a nominal frequency of 2.097152 MHz. In operation, the counter is programmed to generate a square wave which becomes an interrupt sequence used by the microcontroller 22. The period of the counter is programmed by the microcontroller 22 by writing a 16 bit number T(n) to the counter's data register. The counter then generates a square wave output PLL+, which becomes the reference sequence for the weld controller, with a period of T(n) times the period of the system clock. The output PLL+ of the counter is fed back to one of the interrupt request pins of the microcontroller 22. This signal is also inverted, PPL-, and fed to another interrupt request pin of the microcontroller 22. FIG. 2 shows the intended timing relationship between the input line voltage waveform and the signals PLL+, PLL- after the weld controller 10 has acquired and is tracking the input line voltage. High to low transitions of the signal PLL- are intended to occur approximately at the zero crossings of the input line voltage. High to low transitions of the signal PLL+ are intended to occur 90 degrees later, or at the peaks of the line voltage. In steady state operation, the frequency of the external phase reference clock is twice that of the input line voltage. This is used to divide the input line voltage nominally into four distinct quadrants, labeled q1, q2, q3, and q4 in FIG. 2. Timing of the quadrants is defined relative to the signals PLL+ and PLL- and not on the timing of the input line voltage. The clock period may be written to the counter at any time during the cycle. The clock period changes on the positive going edge of the signal PLL+. This feature is utilized in the phase reference generator function to be described subsequently, which sets the period of the clock to track the input line voltage.

Figure 3:
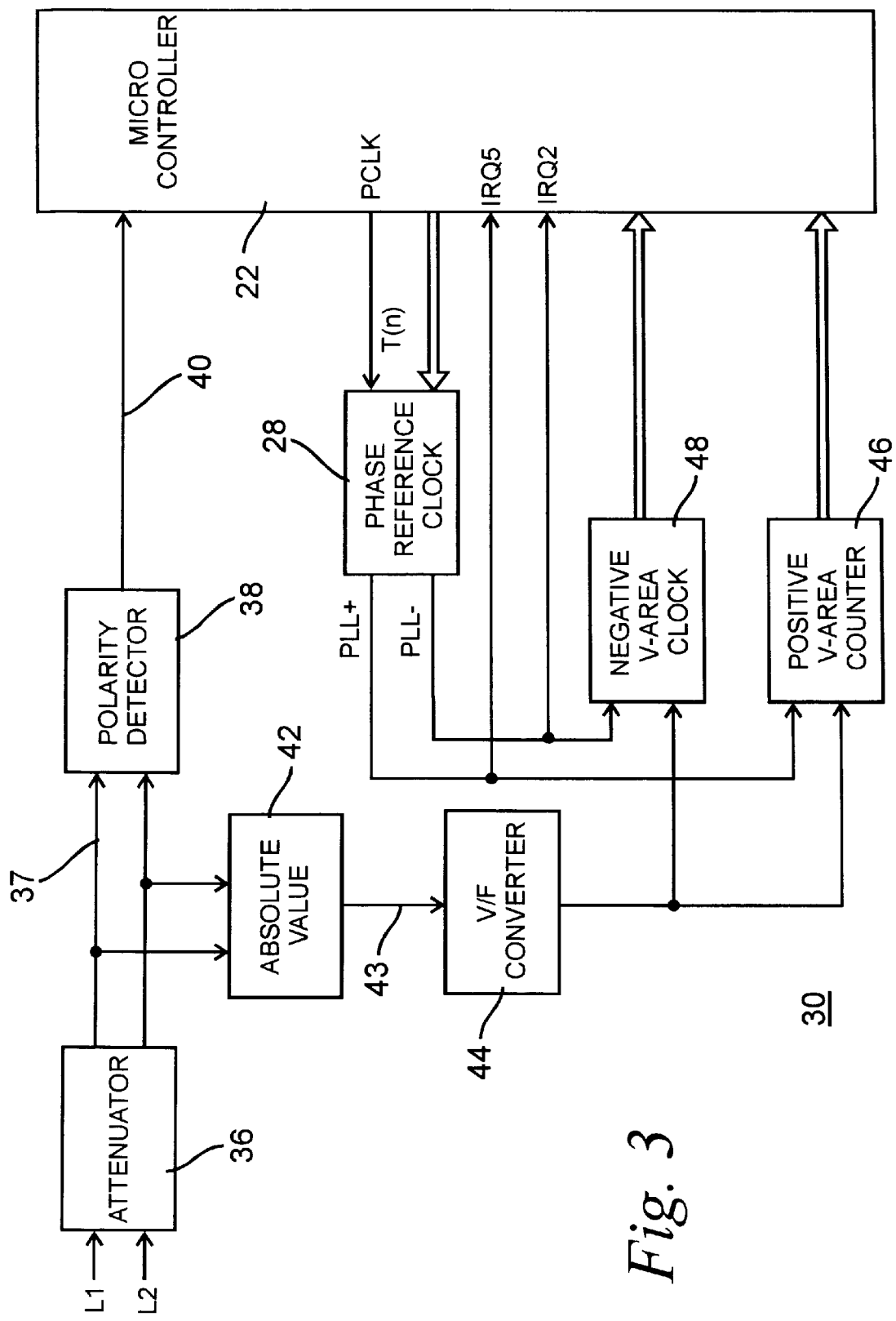
FIG. 3 illustrates a block diagram of a digital voltmeter 30 used in the weld controller illustrated in FIG. 1.

A block diagram illustrated in FIG. 3 provides a description of the digital voltmeter 30 of the weld controller 10. The line voltage to be measured, nominally 480 VAC, is provided by the weld control and is reduced to approximately 3 VAC by attenuator 36, which also provides galvanic isolation. The polarity of the sinusoid is tracked via a polarity detector 38 whereby the output 40 appears as a logic 1 for a positive polarity while a negative polarity appears as a logic 0. The attenuated line voltage 37 also feeds an absolute value circuit 42, which rectifies the sinusoidal signal. The rectified, attenuated line voltage 43 is then fed to a commonly available voltage to frequency converter circuit 44, such as a model VFC32, manufactured by Analog Devices and others. This device generates a pulse train, the instantaneous frequency of which is proportional to the magnitude of its input voltage. This pulse train feeds two gated counter circuits 46, 48, both of which are channels of a commonly available 3-channel 82C54-2 programmable counter integrated circuit manufactured by Intel and others. The counters are configured to increment any time a low to high transition appears on the clock input terminal while the gate terminal is in the logic high state. Counter 46, denoted the positive volt-time-area counter, is gated by the signal PLL+ previously described in the phase reference clock 28 description above, while the other counter, denoted the negative volt-time-area counter is gated by the PLL- signal. The notions of positive and negative counters do not refer to the polarity of line voltage, but rather to the polarity of the signal PLL+ which gates the positive counter 46 and PLL- which gates the negative counter 48. This allows the rectified volt-time-area to be captured in hardware on a quadrant by quadrant basis, according to the quadrants defined in FIG. 2. The polarity signal may also be read by the microcontroller 22 at any time, so a determination of the polarity of the line voltage can be made.

The count contained in each counter 46, 48 is proportional to the volt-time area of the input line voltage for that polarity over the time period counted. The value contained in a counter can be latched internally and subsequently read by the microcontroller under software control. Each counter can also be cleared under software control. In operation, at each interrupt of the phase reference clock above, the appropriate counter is read; the positive counter 46 at the end of q1 and q3, and the negative voltage counter 48 at the end of q2 and q4. The value in the counters read at the end of each interrupt are denoted as Vq1, Vq2, Vq3, and Vq4, respectively. With the phase reference clock 28 synchronized with the line voltage, and assuming the input line voltage waveform is a sinusoid, the RMS value of the input line voltage is related to the sum of the volt-time areas by Vline=Kv*(Vq1+Vq2+Vq3+Vq4). The volt-time area in the counters is latched and read at each interrupt to accommodate the needs of a phase reference generator 50, which utilize these voltages to derive the phase error as will be described subsequently.

Figure 4:
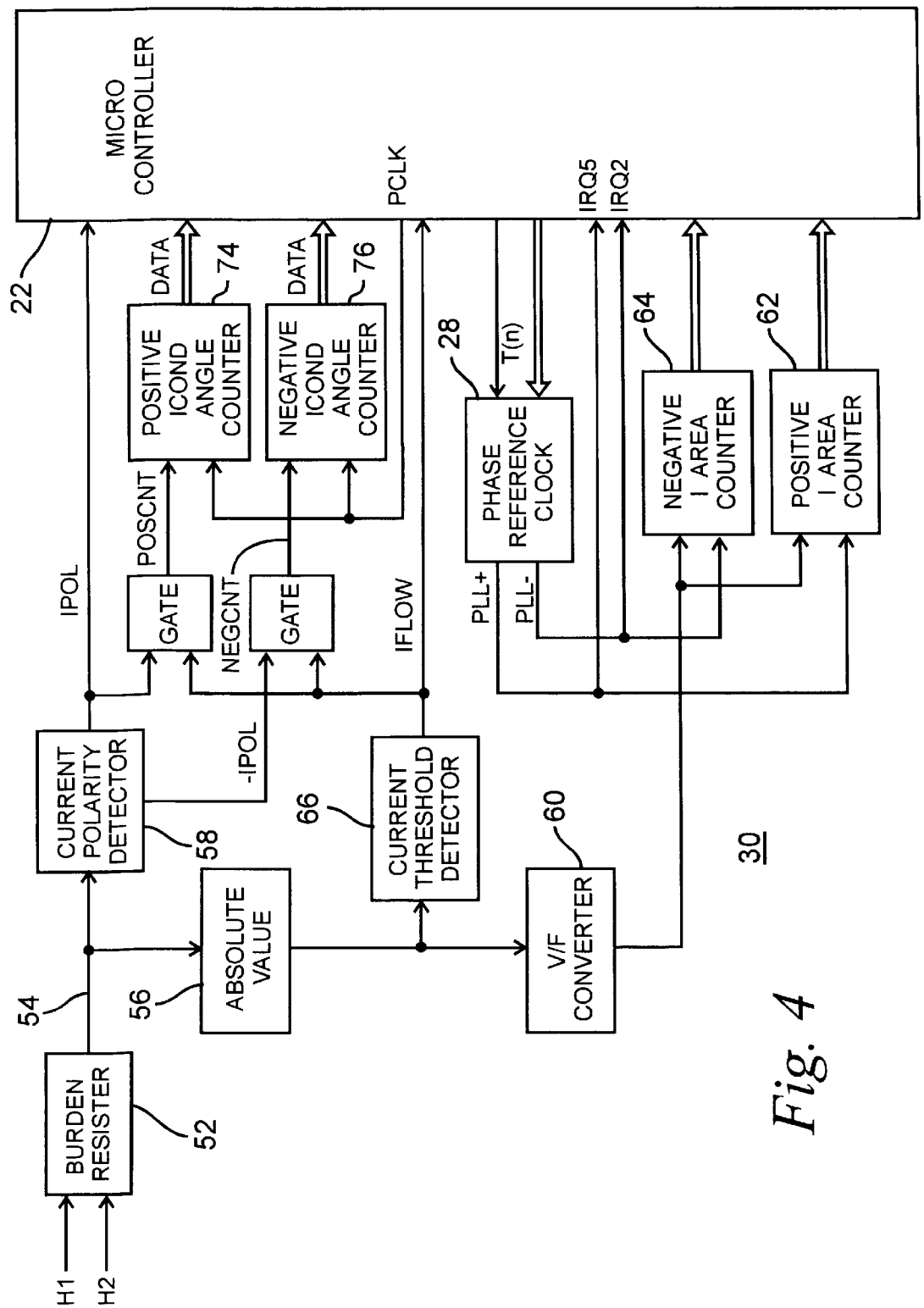
FIG. 4 illustrates a block diagram of an RMS current meter as employed in the present invention.

The digital current meter 34 measures the current-time area of weld pulses generated by the weld controller 10 and converts them to an RMS current using principles well known to those skilled in the art. FIG. 4 shows a block diagram description of the RMS current meter 34 as employed in the present invention. Current is sampled from the load side of the solid state contactor 26 using the current transformer 32. The current H1, H2 measured by the current transformer is transformed into a voltage across burden resistor 52. In one configuration of the weld controller 10, the burden resistor has a value of 2.52 ohms and the turns ratio is 1000:1, resulting in a current of 1000 Amperes in the load causing a voltage of 2.52 Volts to be developed across the burden resistor 52. The voltage 54 developed across the burden resistor feeds two circuits. An absolute value circuit 56 rectifies the voltage 54 developed across the burden resistor, and a current polarity detector circuit 58 determines the polarity of the weld current and develops a digital output IPOL, with a logic 1 signifying positive current flow and a logic 0 signifying negative current flow. IPOL is an input to the microcontroller 22. An inverse polarity signal—IPOL is also generated.

The rectified voltage proportional to the line current is then fed to a voltage to frequency converter circuit 60. As in the digital voltmeter 30 described above, this device generates a pulse train, the instantaneous frequency of which is proportional to the magnitude of its input voltage. This pulse train feeds gated counters 62, 64 which are similar to the programmable counter integrated circuits previously described above with reference to the digital voltmeter 30. Counters 62, 64 are configured to increment any time a low to high transition appears on the clock input terminal while the gate terminal is in the logic high state. Each counter 62, 64 develops a signal which is proportional to the current-time area of the input.

Signals POSCNT and NEGCNT are the logical combinations of the signals IPOL and IPOL−, and a signal IFLOW. The signal IFLOW is derived by passing the rectified voltage across the burden resistor through a threshold detector 66 with a threshold value $I_{th}$. By design, this threshold corresponds to a nominal current of 20 amperes in the present instance. This feature allows the weld controller to ignore noise which might be generated in the current transformer 32 and associated circuitry, and to ignore other non-linearities inherent in current transformers when subjected to high currents. The presence of this threshold causes minimal error in current measurement in a typical weld application. Other current transformers can be substituted in applications where the weld current is significant with respect to this threshold, with appropriate software scaling, thereby reducing the effective value of the current threshold to acceptable levels. The signal POSCNT is formed by the logical AND 68 of the IFLOW and IPOL signal. The signal NEGCNT is formed by the logical AND 70 of IFLOW and the negation of the IPOL signal.

The signal POSCNT gates a positive current counter 74, whereas the signal NEGCNT gates a negative current counter 76. These counters provide a value proportional to the conduction angle of the respective input current signals POSCNT and NEGCNT. These counters count at a fixed rate of 2097152 counts/second as determined by the system clock, labeled PCLK, whenever gated. The constant of proportionality is a function of the input line frequency, a quantity which is determined by the phase reference generator 50 described below. Using the measured conduction angle, as determined from the appropriate current counters 74, 76, the current-time area as determined from the value of the appropriate current counters 62, 64, the line frequency, and a knowledge of the firing angle which caused a given weld pulse, as computed by the weld control, the RMS weld current of a weld pulse can be computed by the microcontroller 22 using a variety of different methods and not an object of the present invention.

An accurate, stable time base which is synchronized with the input line voltage is essential for proper operation of any weld controller. The input line voltage has at least three variables that are initially unknown, including the voltage, the frequency, and the relative phase angle. For a pure sinusoidal input, the phase and frequency of the input voltage can be uniquely determined by the times of the zero crossings relative to a reference time. The traditional approach to generating a time base involves measuring the zero crossings of the voltage waveform directly either by sampling the polarity of the input voltage waveform on a regular basis and determining where in time the input voltage waveform transitions from one polarity to another, or by developing circuitry which determines the zero crossing of the waveform and generating an interrupt to the microcontroller in response to the crossings. This process is called phase discrimination and can be implemented by amplifying and clipping the input line voltage such that a square wave representing the instantaneous polarity of the line voltage results. If the input line voltage is truly sinusoidal, the transitions of the resulting square wave accurately indicate the locations of the zero crossings. However, line voltages in welding applications are rarely pure sinusoids, as equipment drawing current from the weld bus can corrupt the line voltage, injecting noise and other distortion. Noise and distortion can cause erroneous and/or inaccurate transistions in the resulting square wave, which severely limits the reliability, accuracy and stability of this traditional approach. The present invention develops a timing reference based on integrating the line voltage to develop a signal proportional to the volt-time area of the waveform from which an estimate of the phase error between an internal time base and the input line voltage can be made. Errors are estimated based on the present cycle of line voltage and are used to compute a correction to the internal phase clock to be applied to the next cycle of line voltage. This integral approach inherently provides noise immunity and offers significant improvement over the more traditional approach which has a tendency to amplify the noise.

The phase reference generator 50 described herein offers significant improvement in performance over the prior art. The phase reference generator is a discrete time, time varying feedback control loop which reads the values of Volt-Time area developed by the digital voltmeter 30. Two samples of the input volt-time area are used to compute the phase error. This has the advantage of allowing the system to compute a phase error based on the present cycle which can be used to correct the next cycle, thereby eliminating the transport lag inherent in prior approaches.

In the present invention, the weld firing sequence is always in reference in time to the positive to negative transitions of the line voltage. To maintain balanced firing in the weld controller 10, it is desirable to keep the estimated time base constant over a nominal period of the input voltage. For this reason, the phase reference generator 50 changes its internal period to attempt to coincide with the nominal positive to negative transition of the input voltage waveform. A compensator generates a sequence of phase reference clock counter values, T(n), based on an observed error sequence E(n), which drives E(n) towards zero. The compensator accepts two inputs. One input is a counter value X1(n) which, if fed directly to the phase reference clock 28 would result in a square wave with period one half of the nominal expected period of the input voltage waveform. Since the base line frequency in a welding application is generally known, a basic frequency can generally be determined and used as a feed-forward input in a control scheme, resulting in a less sensitive control loop. The other input to the compensator is a sequence which is representative of the phase error (in degrees) between the reference sequence PLL+, and the previous positive to negative zero crossing of the sinusoid. The output of the compensator is the sequence of counter values T(n) which will generate the subsequent time period of the phase reference clock 28.

Figure 5:
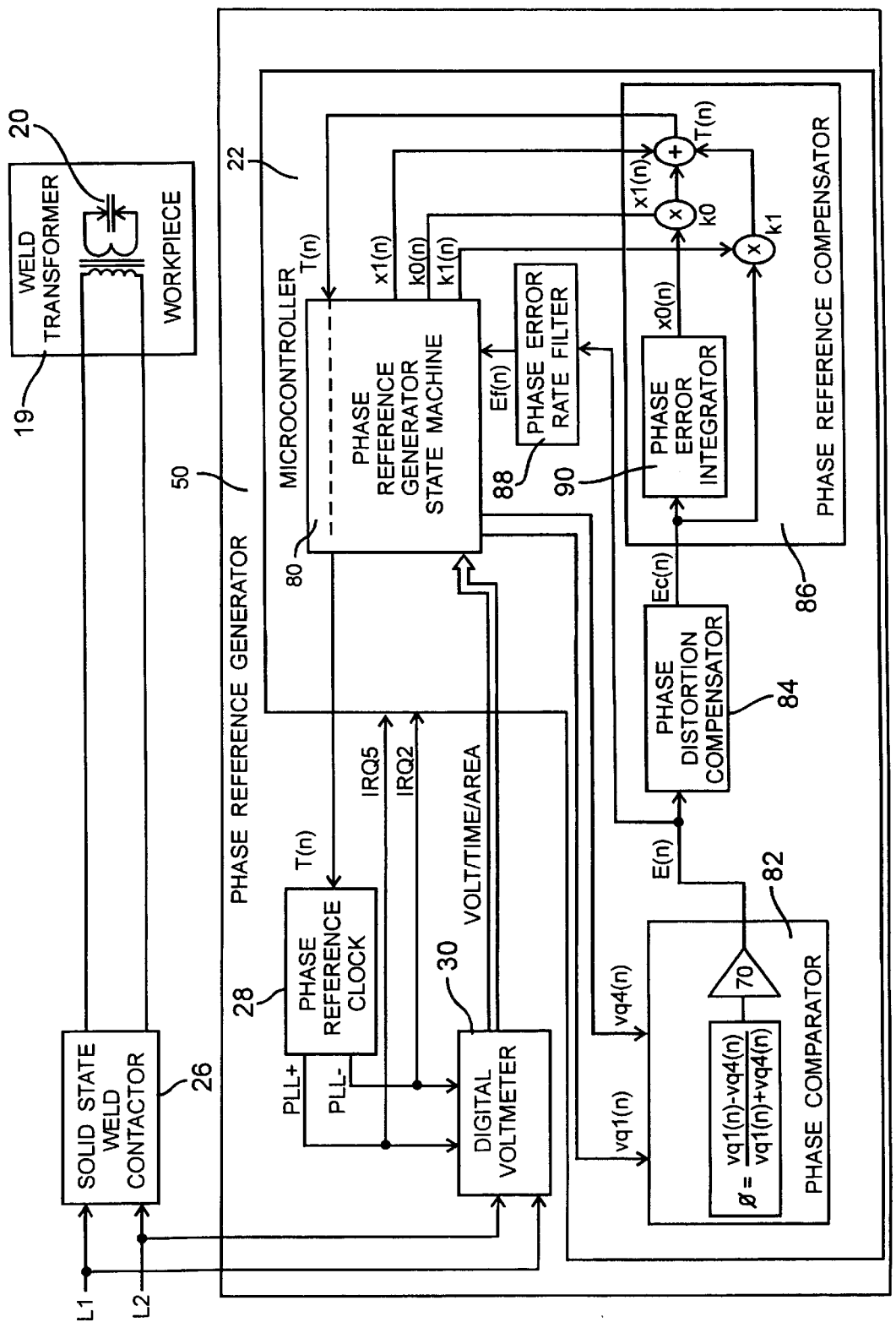
FIG. 5 is an overview of the control system block diagram which describes the basic principles of the phase reference generator illustrated in FIG. 1 and constructed according to the present invention.

FIG. 5 is an overview of the control system block diagram which will be used to describe the basic principles of the phase reference generator 50. The phase reference generator 50 includes the microcontroller 22, the phase reference clock 28, and the digital voltmeter 30 of the weld controller 10 and is a closed loop discrete time feedback control system which estimates the time of arrival of zero crossings in the input line voltage L1, L2. It manages the instantaneous period of the phase reference clock 28 such that the relationship between the input line voltage and the PLL+ and PLL− signals shown in FIG. 2 is established and maintained. A phase reference state machine 80 manages the highly non-linear process of detection and acquisition of the input line voltage as processed by the digital voltmeter 30 and the phase reference clock 28 previously described. A phase comparator function 82, implemented in the microcontroller 22 software estimates the error in degrees between the phase of the input voltage waveform and the phase reference clock. A phase distortion compensator 84, also implemented in the microcontroller 22 software, compensates for the effects of the weld load and line impedance on the input voltage waveform during welding. A phase reference compensator 86 computes a counter value T(n) proportional to the time varying period of the phase reference clock 28 required to maintain the relationship between the line voltage and the PLL+ and PLL− signals.

The phase comparator 82 does not rely on direct observation of the zero crossings to derive phase error. In the preferred embodiment, the volt-time area functions for the 4th and 1st quadrants of the digital voltmeter function for the nth cycle of line voltage, denoted Vq4(n) and Vq1(n) are used to create a function φ(n) given by:

$$\varphi(n) = \frac{Vq1(n) - Vq4(n)}{Vq1(n) + Vq4(n)} \tag{1}$$

This error function, when multiplied by a factor of 70 as shown in FIG. 5 gives the approximate phase error in degrees between the phase reference sequence and the input voltage waveform, at the positive to negative zero crossing of the line voltage. The resulting sequence of error signals, denoted E(n), is given by:

$$E(n) = 70 * \varphi(n) \tag{2}$$

Figure 6:
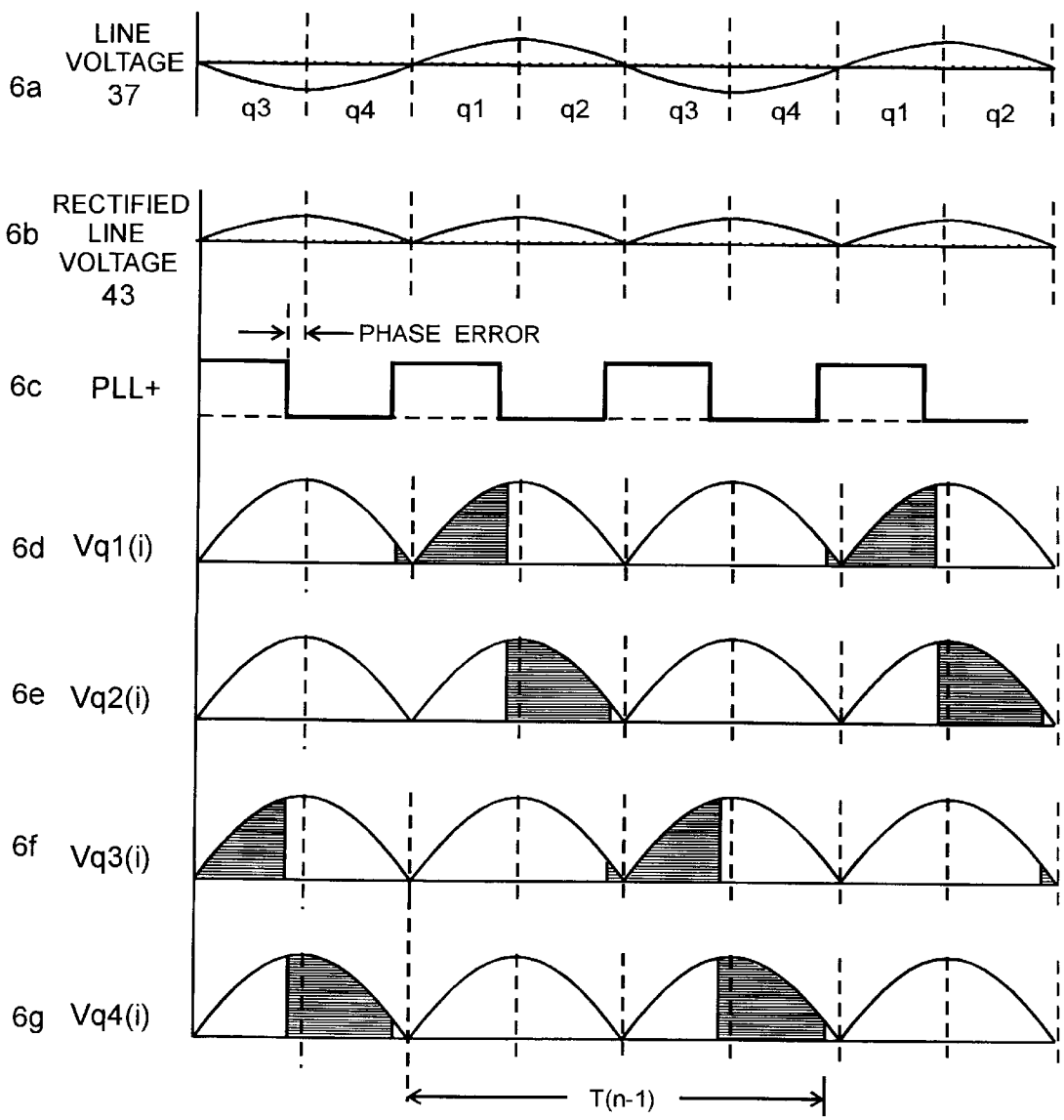
FIG. 6 depicts the waveforms and quantities integrated by the digital voltmeter illustrated in FIG. 3.

The quantity represented by E(n) is an approximation to the error in phase between the interrupt sequence PLL+ and the positive to negative zero crossing of the input waveform. FIG. 6 depicts the waveforms and quantities integrated by the digital voltmeter. The input waveform is shown in FIG. 6a, while its rectified counterpart is shown in FIG. 6b.

The quantities represented by Vq1(i) and Vq4(i) are shown in FIGS. 6d and 6g as shaded areas. The integrated quantity is represented as the area under the curve and is shifted by the phase error, either leading or lagging the phase of the line voltage 6a. The PLL+ and PLL− signals differ from the line voltage by this phase error and are used to define the volt-time-area under the curve for the integration. The values Vq1, Vq2, Vq3 and Vq4 are generated automatically by the interaction of the phase reference clock 28 and digital voltmeter 30 functions described above. The weld controller simply reads these values as they become available in the interrupt routines which service the PLL+ and PLL− interrupts.

Figure 7:
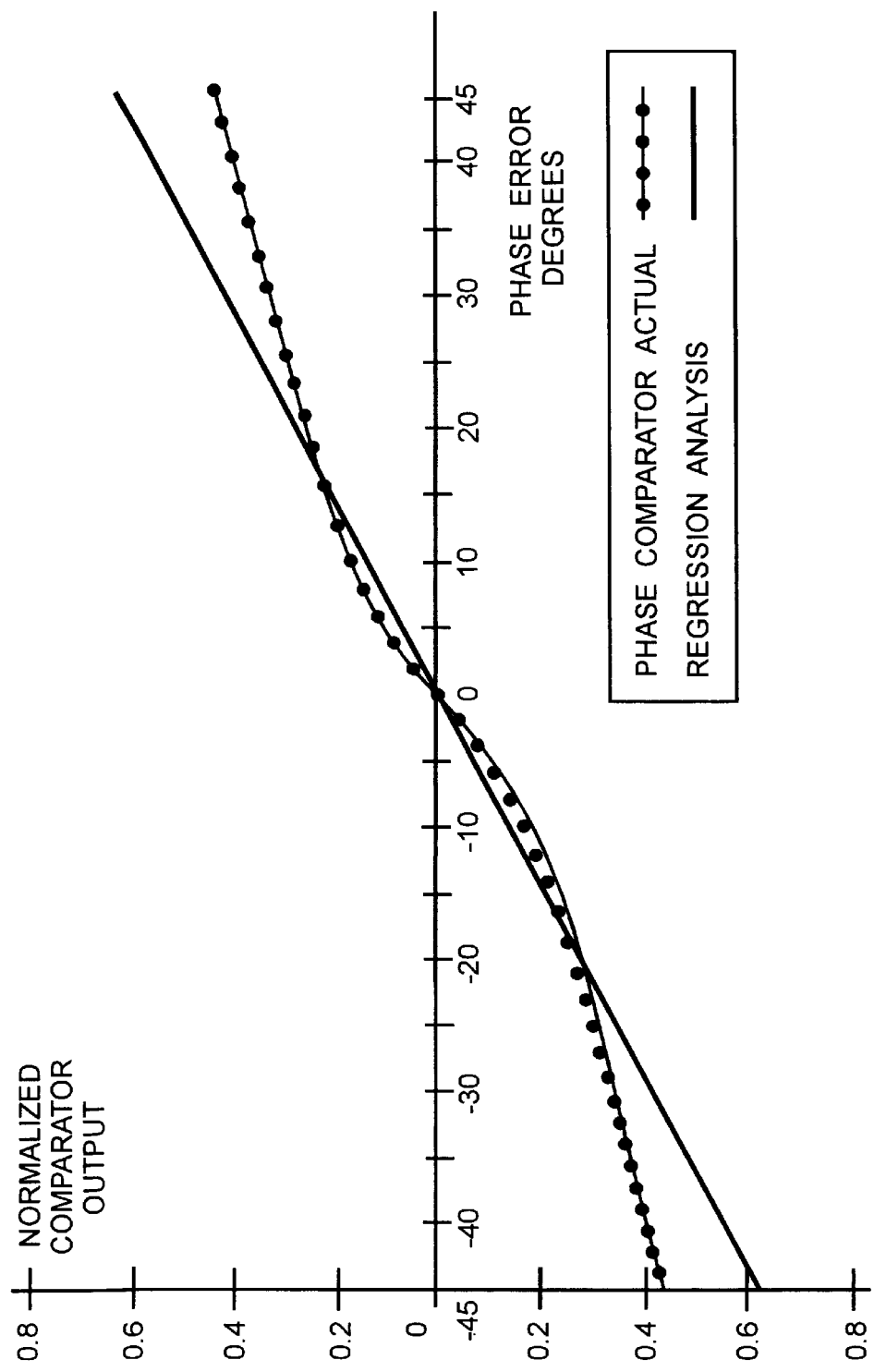
FIG. 7 is a graphical representation of the output of the phase comparator as a function of phase error.

FIG. 7 is a graphical representation of equation 1 as a function of the phase error, φ. The quantity represented by equation 1 is normalized and dimensionless, but over the range of phase errors between approximately −25 and +25 degrees, the function is fairly linear. A regression of the phase error data, taken over the range ±25 degrees, is also shown and provides good approximation of the output of the phase comparator as a function of a phase error over this limited range. Under normal, steady state operating conditions, the phase error lies well within that range and the regression in the PLL calculations provide an accurate estimate of the phase error over a wide range. The equation of the regression is:

$$\varphi(\phi) = 0.014207\phi \tag{3}$$

or, solving for φ:

$$\phi = 70\varphi \tag{4}$$

It can be readily demonstrated that the output of the phase comparator 82 is relatively insensitive to differences in frequency between the input waveform and the internal phase reference for small variations in frequency. The present implementation utilizing only the q4(i) and q1(i) integrations represents an improvement to previous methods that used all four quadrants since the phase error information is available within the present period of the input voltage waveform to generate a correction on the next period of the input voltage waveform. Further, by nominalizing the difference, the computed phase error becomes independent of the magnitude of the line voltage. The phase comparator 82 utilizes the Vq4(n) and Vq1(n) information furnished by the phase reference state machine 80 to generate an estimate of the phase error E(n) between the input line voltage and the phase reference clock 28. The phase error E(n) generated by the phase comparator 82 feeds a phase error rate filter 88 which develops a low passed filtered version of the absolute value of the rate of change of the phase error Ef(n). This quantity is a function of its previous value and the absolute change in the phase error signal E(n). The phase reference state machine 80 uses this filtered error rate signal to determine its state.

The phase distortion compensator 84 has the ability to compensate for phase distortion induced while welding. When welding, the presence of line impedance between the weld control and the voltage source creates significant phase distortion which the phase reference generator 50 will attempt to track if not detected. This can result in degraded performance of the weld control. The phase reference generator 50 estimates the phase distortion caused by the line impedance and provides compensation to overcome this distortion. In the present invention, the amount of phase distortion is estimated while welding, and a correction applied to the phase comparator 82 output E(n), so that the resulting phase error estimate, Ec(n), reflects more accurately the error between the phase reference generator output and the actual bus voltage. Since the weld controller 10 controls the firing of the thyristors, it can tell the difference between the open circuit condition, in which the actual line voltage and the measured line voltage, are equal, and the condition during welding in which the measured line voltage contains phase distortion with respect to the actual bus voltage. In a commercial power distribution system the line frequency and phase normally do not change rapidly, since bus voltage is generated by very large rotating equipment with significant inertia; for instance by a nuclear power plant. Welding is not permitted in the system until the phase reference generator has locked onto the open circuit input voltage waveform. When a weld is initiated, the phase reference generator 50 is operated open loop for the first six cycles of weld, without incurring a significant difference in phase relative to the actual bus voltage. During this period, the phase error measured by the phase comparator 82 is the result of phase distortion caused by the interaction of line and load impedance while weld current is flowing. By design, the weld controller 10 typically regulates within +/−2% of setpoint current or setpoint conduction angle within 3 cycles. The phase comparator 82 output E(n) is averaged over cycles 3, 4, 5 and 6 of weld to generate the estimate of phase distortion. After the sixth cycle, this estimate of phase distortion is subtracted from the output of the phase comparator and the phase reference generator loop is again closed, so that the phase reference generator can continue to track actual long term variations in frequency and phase between itself and the bus voltage. Once the weld is complete, and input voltage again reflects the true weld bus voltage, the phase distortion estimate term is removed and the phase reference generator operates normally as described above.

Figure 8:
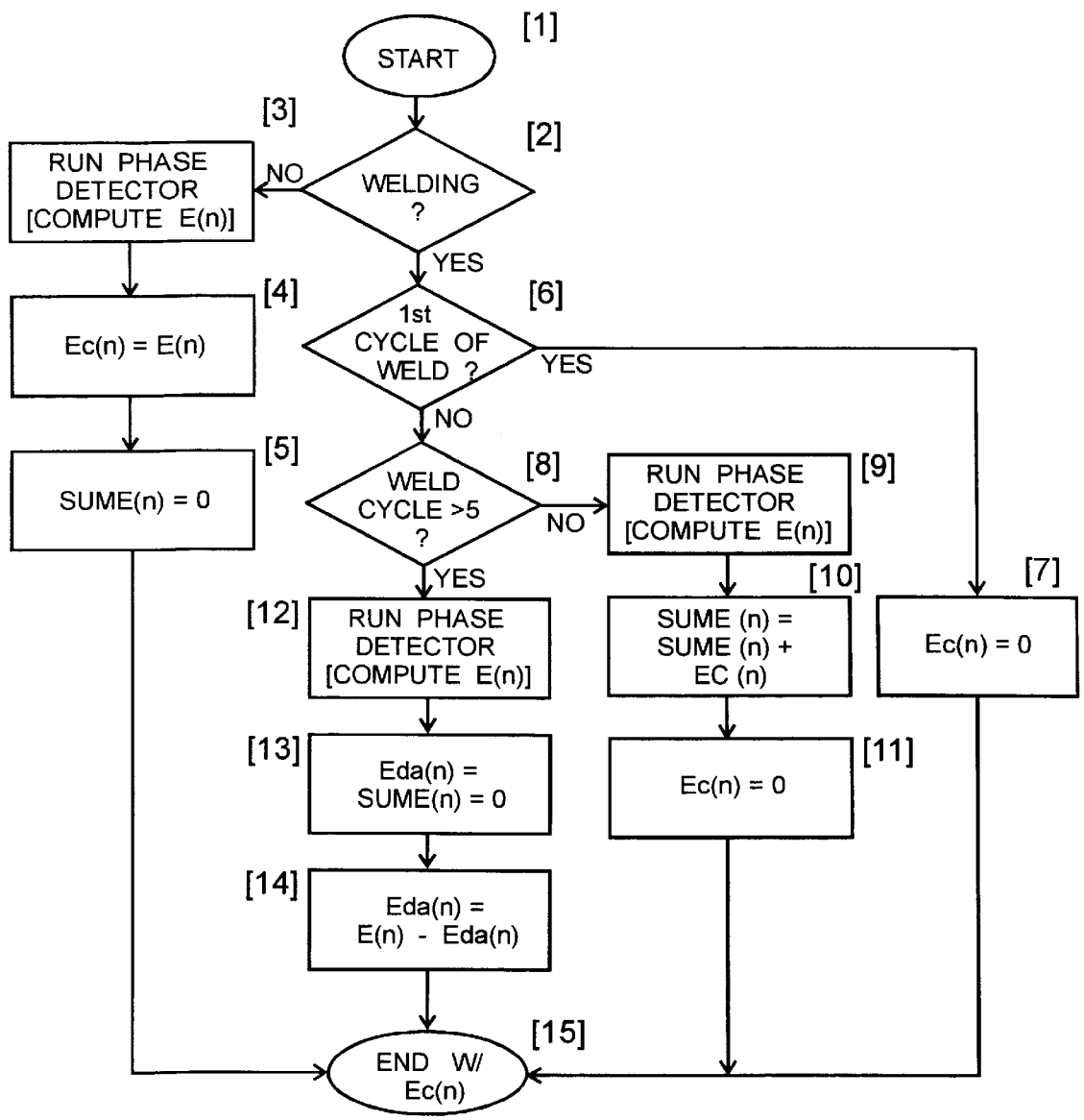
FIG. 8 is a flowchart depicting the method the phase comparator illustrated in FIG. 5 utilizes to estimate and compensate for phase distortion while welding.

FIG. 8 is a flowchart showing how the phase comparator 84 compensates for phase distortion while welding. The phase distortion compensator 84 first detects [1] whether the weld controller 10 is actively welding [2]. If the system is not welding, then no phase distortion compensation is required. The system actuates the phase detector function [3] in software, the output of which is E(n) per above. Since phase distortion compensation is not required when not welding, the distortion compensated error, Ec(n), is set to E(n) [4]. Ec(n) is the phase error fed to the phase reference compensator 84, which generates the value of T(n) fed to the phase reference clock 28. An internal variable, SUME(n) the function of which will be described subsequently, is set to a value of 0 when welding is not occurring [5]. If the system is welding [2], and the system is in the first cycle of weld [6], then Ec(n) is immediately set to a value of 0 [7]. The weld controller may apply a delayed firing first cycle of weld to provide for flux balance in the weld transformer, and as such the phase error measured may be different on the first cycle than on subsequent cycles. A value Ec(n)=0 causes no correction in the Phase Reference Clock, so the clock effectively "free runs" during this cycle.

If the system is welding [2] and the system is not in the first cycle of weld [6], but the system has not completed a minimum of 6 full cycles of weld [8], the phase comparator function described above is executed [9]. The error computed by the phase detector, E(n) is assumed to be due to phase distortion, and is added to the intermediate variable SUME(n) [10]. The phase distortion compensated value of phase error, Ec(n) is set to zero [11] when the system is in this mode, causing the phase reference clock to maintain its period unchanged.

If the system is welding [2], the system is not in the first cycle of weld [6], and the system has completed a minimum of 6 full cycles of weld [8], the phase reference generator loop is again closed. The phase detector function is executed [12], detecting the phase error between the phase reference clock 28 and the input line voltage for this cycle of weld, E(n). The intermediate variable, SUME(n) now contains the running sum of the phase errors generated in the weld cycles 3 through 6, ignoring the error generated in the first two cycles of weld, since they may have different characteristics from the others and is assumed to represent the sum of phase distortion error caused by the welding process over cycles 3 through 6. The average phase distortion error, Eda(n) is computed by dividing SUME(n) by 4 [13]. This value of phase distortion error is subtracted from E(n) [14] to provide the phase distortion compensated value, Ec(n) for this cycle of weld.

The phase reference compensator 86 utilizes the distortion compensated phase error computed in the phase comparator 82 and phase distortion compensator 84 to generate a sequence of phase reference counter values, T(n), in order to track the input line voltage and maintain the relationship shown in FIG. 2 above. The phase reference state machine 80 furnishes an estimate of the phase reference clock counter value, x1(n), proportional to half the nominal period of the input line voltage. To this estimate are added a term proportional to the phase error computed from the present cycle, E(n), and a term proportional to the sum of all previous phase errors, denoted x0(n) in FIG. 5. This sum comprises a discrete time free integrator 90, which is necessary in a physical system to track line voltage with zero phase error. The constants of proportionality for the E(n) and x0(n) terms are k1 and k0 respectively. The resulting phase reference counter value for the next cycle, T(n+1), is given by:

$$T(n+1)=k0*x0(n)+k1*E(n)+x1(n) \qquad (5)$$

This phase compensator 86 gives adequate performance under a wide range of operating conditions with minimum computational burden on the microcontroller 22. Other versions of compensation could be used and considered, including full state feedback.

Figure 9:
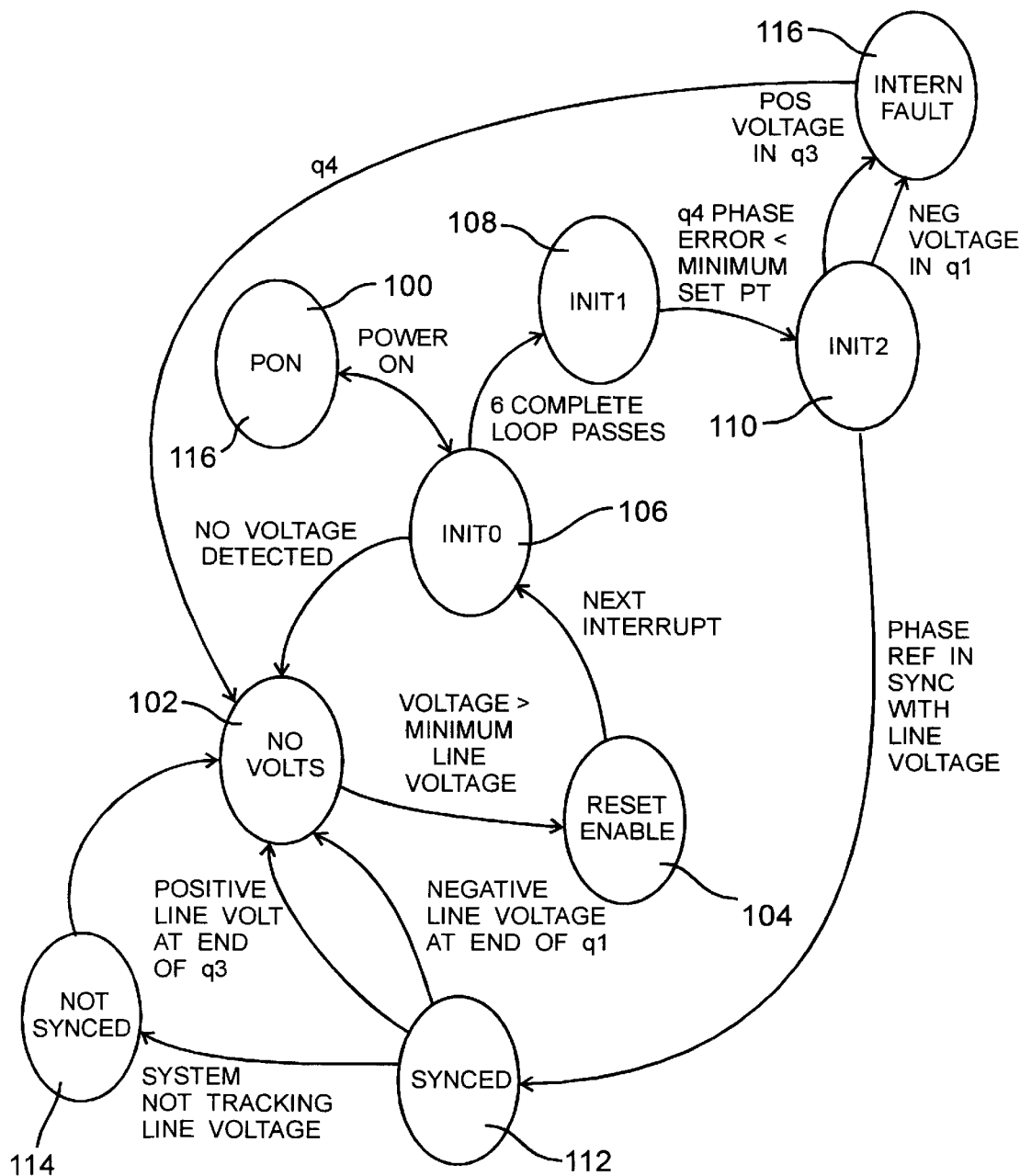
FIG. 9 shows an overview of a phase reference generator state machine as implemented in the weld controller of the present invention.

The phase reference generator 50 algorithms are dependent upon the phase reference clock 28 being reasonably well synchronized with the input line voltage, generally within +/−25 degrees. When the weld control is first powered on, or after a loss of input line voltage, the magnitude, frequency and phase of the input line voltage relative to the phase reference clock is not well known. The phase reference generator state machine 80 is used to manage the process of detection, acquisition and management for the phase reference generator 50. FIG. 9 shows an overview of a phase reference generator state machine 80 as implemented in the weld controller of the present invention. The state machine comprises the following states: PON 100, NO_VOLTS 102, RESET_ENABLE 104, INIT0 106, INIT1 108, INIT2 110, SYNCHED 112, NOT_SYNCED 114, and INTERNAL_FAULT 116. Each state shown in FIG. 9 represents a configuration of the system and actually comprises other state machines, with individual states, driven primarily by interrupts generated by the PLL+ and PLL− signals.

In the NO VOLTS State 102, the phase reference clock 28 is allowed to free run until line voltage is detected. No attempt to stay synchronized with the input line frequency is made. The phase reference clock is set to a frequency of twice the nominal line frequency, 120 Hz for 60 Hz systems and 100 Hz for 50 Hz applications. No attempt is made to discern between an interrupt generated by the PLL+ and PLL− signals in the NO VOLTS State. When the NO_VOLTS state is entered, upon receipt of either a PLL+ or a PLL− interrupt, the value of the positive volt-time-area (VTA) counter 46 of the digital voltmeter is read, resulting in a value Vq1 proportionately equal to the volt-time area of the first quadrant of time and the counter is reset. On the next interrupt, the negative counter 48 is read, resulting in a value Vq2 proportionately equal to the volt-time area of the second quadrant and the counter is reset. On the next interrupt, the positive counter 46 is again read resulting in a value Vq3 proportionately equal to the volt-time area of the third quadrant, and on the following interrupt, the negative counter 48 is again read resulting in a value Vq4 proportionately equal to the volt-time area of the fourth quadrant. The RMS value of the input line voltage is then computed by Vline=Kv * (Vq1+Vq2+Vq3+Vq4). This voltage is compared to a value MINVOLTS, which for a 480 VAC, 60 Hz version is set at 200 Volts. If the line voltage magnitude computed at the end of Q4 is less than MINVOLTS, the system remains in the NO_VOLTS state 102. If the line voltage magnitude is greater than MINVOLTS, the system is ready to transition to the next state, INIT0 106. The system first momentarily enters state RESET_ENABLE 104.

When the system enters the RESET_ENABLE State 104, the interrupts are restarted, and the phase reference compensation function, Eq. 8 is initialized in anticipation of entering the INIT0 state 106 using the following values:

$T(0)=17476$; $x1(0)=17476$; $x0=0$; $k0=1$; and $k1=0.5$.

The number 17476 drives the phase reference clock to operate at 120 Hertz, the nominal line frequency for power in the United States. To achieve a desired phase reference clock frequency, f, the phase reference counter must be loaded with the value $T(0)$. The counter of the phase reference clock 28 is set to this value of $T(0)$ so that it starts on the next rising edge of the PLL+ signal. The system then immediately transitions to the INIT0 state 106.

The system remains in the INIT0 state 106 until an adequate line voltage is sensed over a number cycles. The system transitions to the INIT0 state on either power-up, PON state 100, where it is assumed that line voltage is present, or on the first interrupt after the RESET_ENABLE state 104, which resets the PLL+ and PLL- interrupts. Upon the first interrupt following the transition to the INIT0 state 106, the system transitions to an INIT0-Q1 state. The positive VTA counter 46 is read and reset, forming the proportional value Vq1. The value of the negative current time area (ITA) counter 64 and conduction angle (CA) counter 76 are also read, giving the current-time area and conduction count values for the previous negative half-cycle. If the interrupt causing the transition to INIT0-Q1 was the PLL- interrupt, the next interrupt causes the system again to transition to the INIT0-Q1 state where the process is repeated until the PLL+ interrupt occurs. This synchronizes the phase reference generator 50 such that the interrupt sends the system into the Q1 state, per FIG. 6. The phase reference clock 28 is not necessarily synchronized with the line voltage per FIG. 6 at this point. Assuming the transition to the INIT0-Q1 state was caused by the PLL+ interrupt, the next PLL- interrupt will cause a transition to the INIT0-Q2 state. Synchronization with the reading of the appropriate volt-time-area counters 46, 48 following the PLL+ and PLL- interrupts is now established. In the INIT0-Q2 state, the system reads the negative volt-area counter 48 and forms the proportional quantity Vq2. Upon receipt of the next interrupt, the system transitions to the INIT0-Q3 state, where the positive volt-area counter 46 is again read. Upon receipt of the next interrupt, the system transitions to the INIT0-Q4 state. The negative counter 48 is read and the line voltage for the cycle computed. If the line voltage is less than MIN_VOLTS, the system transitions immediately to the NO_VOLTS state 102. If the line voltage is greater than MIN_VOLTS, the INIT0 counter is incremented, indicating that the system has successfully completed a cycle through the INIT0 quadrant state loop. After 6 successful passes through the quadrant state loop, the system transitions to the INIT1 State 108.

The INIT1 State 108 is the first attempt to close the phase reference loop. Upon the first interrupt after entry into the INIT1 State 108, the system transitions to an INIT1-Q1 state. The positive VTA counter 46 is read, forming the quantity Vq1. The phase compensator 84 function is executed utilizing the values of Vq4 and Vq1 just determined, generating the phase error signal E(n). The phase error rate filter function 88 is also executed, developing a phase error rate, Re(n). The phase distortion compensator 84 function is also executed according to the flow chart of FIG. 8, returning the actual phase error, Ec(n)=E(n), since welding is not permitted in this state. The phase reference compensator function 84 is executed and a phase reference counter value is updated with a new value of T(n). On the next interrupt, the system transitions to an INIT1-Q2 state and the negative VTA counter 48 is read, providing a value for Vq2. On the next interrupt, the system transitions to an INIT1-Q3 state. In this state, the positive VTA counter 46 is read, providing a value for Vq3.

On the next interrupt, the system enters the INIT1-Q4 state. The negative VTA counter 48 is read, forming the quantity Vq4. The line voltage for the cycle is computed. A count is maintained of the number of passes through the INIT1-Q4 state, indicating a complete cycle through the INIT1 quadrant states. If Re(n) computed in INIT1-Q1 diminishes to less than 200 counts within 150 cycles through the INIT1 Q1–Q4 states, the system immediately transitions to the INIT2 state 110. If the system has cycled through the INIT1 Q1–Q4 states more than 150 times without Re(n) diminishing to less than 200 counts, the system reverts immediately back to the INIT0 state 106. Otherwise, the system remains in the INIT1 state 108 and the next interrupt causes the system to enter the INIT1-Q1 state where the process repeats.

When the phase reference state machine 80 enters the INIT2 state 110, the phase reference generator 50 is assumed to be fully synchronized with the line voltage and the value generated as T(n) upon entry is assumed to represent the correct line frequency. Since the physical generator which creates the line voltage varies slowly with time, with the exception of phase distortion caused by the process of welding, only minor changes are required to the phase reference generator 50 over time. Accordingly, upon entry into the INIT2 state 110, the phase reference compensator 82 is re-initialized to the following values:

$T(n)=T(n)$ upon entry; $x1(n)=T(n)$ upon entry; $x0=0$; $k0=\frac{1}{8}$; and $k1=\frac{1}{2}$.

When the phase reference generator 50 is truly synchronized with the input line voltage, the PLL+ interrupt which causes the system to transition from the Q4 to the Q1 state coincides approximately with the negative to positive zero crossing of the input line voltage, FIG. 6. Since Vq4 and Vq1 are based on the absolute value of the line voltage, the phase reference will be tracking the input line voltage in frequency, in that the computed phase error is less than a specified value, but the internal phase reference, as defined by the relationship between the internally defined quadrants q1–q4, may differ from that shown in phase of the waveform by 180 degrees. The interrupt which causes the phase reference state machine 80 to enter Q1 may actually correspond to the positive to negative zero crossing. In the INIT2 state 110, this condition is checked and corrected, and the system is allowed to continue to stabilize. A count is kept of the number of complete cycles through the INIT2 state 110, which is updated in the INIT2-Q4 state to be described subsequently. The first interrupt following entry into the INIT2 State 110 causes the machine to enter the INIT2-Q1 state. The positive voltage counter 46 is read, forming the proportional quantity Vq1. The phase comparator 82, phase distortion compensation 84, phase reference compensator 86, and phase error rate filter 88 functions are executed and the phase reference clock 28 is updated with the new value of T(n). The line polarity is also sampled on each pass through INIT2-Q1. If negative line polarity is detected in the initial pass through the INIT2-Q1 state, the next interrupt causes the system to jump to the INIT2-Q4 state, described below. If after a minimum of four complete passes through the INIT2 State 110 have been completed, a negative line polarity is detected in the INIT2-Q1 state, the system transitions immediately to the INTERNAL_FAULT state 116. Otherwise, the next interrupt causes the system to transition to the INIT2-Q2 state.

In the INIT2-Q2 state, the negative VTA counter 48 is read, forming proportional quantity Vq2. Once in the INIT2-Q2 state, the next interrupt causes the system to transition to the INIT2-Q3 state. In the INIT2-Q3 state, the system reads the positive VTA counter 46, forming the proportional quantity Vq3. The line voltage polarity is also sampled. If the line voltage polarity is positive in the INIT2-Q3 state, and the system has made at least four complete passes through the INIT2 state, as determined by sampling the INIT2 pass counter, the system immediately enters the INTERNAL_FAULT state 116. Otherwise, the next interrupt causes the system to enter the INIT2-Q4 state.

In the INIT2-Q4 state, the negative VTA counter 48 is read, forming the proportional quantity Vq4. The line voltage is calculated, but no checks are made on the computed line voltage. The INIT2 pass-counter is incremented, indicating that a complete pass through the INIT2 state has been completed. If the phase error rate, Re(n) has diminished to less than 97 counts, and a minimum of 6 passes through the INIT2 state have been completed, the system transitions to the SYNCED state 112. If at this point the system has completed fewer than six (6) passes through the INIT2-Q4 state, or the phase error rate, Re(n) is greater than 97 counts, the next interrupt causes the system to transition to the INIT2-Q1 state.

In the SYNCED state 112, the phase reference generator is stable with respect to the input line voltage, as demonstrated by the small phase error threshold required to enter the state, and the PLL+ and PLL- interrupts coincide approximately with the zero crossings of the line voltage as described in FIG. 6. At this point, the system is considered to be locked onto the input line voltage, and welding is permissible. The system enters the SYNCED state 112 from the INIT2-Q4 state. Upon the first interrupt after entering the SYNCED state, the system transitions to the SYNCED-Q1 state. The positive VTA counter 46 is read, forming the quantity Vq1. The phase comparator 82, phase distortion compensator 84, phase reference compensation 86, phase error rate filter 88, and functions are executed and the phase reference clock 28 is updated with the new value of T(n). The negative IA counter 64 and CA counter 76 are read, providing the information required to compute the RMS current for the previous negative half-cycle of welding, if applicable. In the SYNCED-Q1 state, the volt-time area for the previous negative half-cycle of line voltage is also computed by summing Vq3 and Vq4. The line voltage polarity is sampled. If the line voltage polarity is negative in the SYNCED-Q1 state, the phase reference generator 50 is not operating in accordance with FIG. 6, and the system immediately enters the NO_VOLTS state 102. If the line voltage polarity is positive, the system transitions to a SYNCED-Q2 state on receipt of the next interrupt.

In the SYNCED-Q2 state, the negative VTA counter 48 is read, forming the quantity Vq2. A WELD FIRING function is executed. Once in the SYNCED-Q2 state, the next interrupt causes the system to transition to the SYNCED-Q3 state. In the SYNCED-Q3 state, the negative VTA counter 48 is read, forming the quantity Vq3. The volt-time area for the previous positive half-cycle is computed by summing Vq2 and Vq3. The positive IA counter 62 and CA counter 74 are also read. The line voltage polarity is also sampled. If the line voltage polarity is positive, the system immediately transitions to the NO_VOLTS state 102. Otherwise, on receipt of the next interrupt, the system transitions to a SYNCED-Q4 state. In the SYNCED-Q4 state, a FIRING COUNTER management function is executed first. The negative VTA counter 48 is read, forming the quantity Vq4. If the running sum of phase error, contained in the state variable x0, is greater than 8000, the system immediately transitions to the NOT_SYNCED state 114. Otherwise, on receipt of the next interrupts, the system transitions to the SYNCED-Q1 state where the process repeats.

The NOT_SYNCED state 114 is entered when the sum of the phase error becomes larger than 8000 counts while in the SYNCED state 112, indicating that the system is no longer accurately tracking the line voltage according to FIG. 6. Upon entry into the NOT_SYNCED state 114, a LINE_SYNC_LOSS error is declared. Upon receipt of the first interrupt after entry into the NOT_SYNCED state 114, the positive VTA counter 46 is read, forming the quantity Vq1. The volt-time area for the previous negative half-cycle is also generated by summing Vq3 and Vq4. Upon receipt of the next interrupt, the system enters the NOT_SYNCED-Q2 state. In the NOT_SYNCED-Q2 state, the positive VTA counter 46 is read, forming the quantity Vq2. Upon receipt of the next interrupt, the system enters the NOT_SYNCED-Q3 state. In the NOT_SYNCED-Q3 state, the negative VTA counter 48 is read, forming the quantity Vq3. The volt-time area for the previous positive half-cycle is generated by summing Vq1 and Vq2. Upon receipt of the next interrupt, the system enters the NOT_SYNCED-Q4 state. In the NOT_SYNCED-Q4 state, the phase reference counter is loaded with the default period, Tref, and the positive VTA counter 46 is read, forming the quantity Vq4. The system immediately transitions to the NO_VOLTS state 102.

The INTERNAL_FAULT state 116 is entered when the wrong line voltage polarity is sensed while in the INIT2 110 state. No Q1 state is defined. When negative line polarity is detected after more than four passes through the INIT2-Q1 state, on the next interrupt, the system transitions to an INTERNAL_FAULT-Q2 state. The negative VTA counter 48 is read and Vq2 is formed. On the next interrupt, the system transitions to the INTERNAL_FAULT-Q3 state and the negative VTA counter 48 is read and the quantity Vq3 formed. The volt-time area of the previous positive half cycle is also formed by summing Vq1 and Vq2. On the next interrupt, the system transitions to the INTERNAL_FAULT-Q4 state. The presence of positive line voltage polarity in the INIT2-Q3 state after a minimum of four cycles through the INIT2 state 110 will also cause the system to transition to the INTERNAL_FAULT-Q4 state, upon receipt of the interrupt. In the INTERNAL_FAULT-Q4 state, the positive VTA counter is NOT read, and the system immediately transitions to the NO_VOLTS state 102.

While the specific embodiments have been illustrated and described, numerous modifications are possible without departing from the scope or spirit of the invention. The above description refers to a weld controller application. However, the principles described are readily applicable to any type of control system using voltage phase control, including motor controls such as AC or DC drives, inverters, power supplies, and the like.

We claim:

1. A method for generating an internal timebase phase reference for providing a sequence of phase angle firing signals to couple an AC line voltage source to a load, the method comprising:

A. generating the internal timebase phase reference;
   B. measuring the AC line voltage to determine its phase error relative to the internal timebase phase reference;

C. estimating phase distortion generated by the coupling of the AC line voltage source to the load as a result of the load being energized from the phase angle firing control in the presence of line impedance;

D. adjusting the internal timebase phase reference in response to the estimated phase distortion.

2. The method of claim 1 wherein estimating the phase distortion further includes adjusting a nominal expected time interval in the internal timebase phase reference in response to the phase error to reduce the phase error on subsequent cycles thereby achieving synchronization between the AC line voltage and internal timebase phase reference prior to providing the sequence of the phase angle firing control signal.

3. The method of claim 2 further including maintaining the internal timebase phase reference frozen at a fixed period following synchronization and prior to providing the sequence of phase angle firing control signals.

4. The method of claim 3 further including estimating the phase error over a predetermined number of fixed periods of the internal timebase phase reference after initiating the sequence of the phase angle firing control signals, each phase error estimate due to phase distortion.

5. The method of claim 4 further including averaging the phase error over a predetermined number of fixed periods of the internal timebase phase reference, resulting in an average phase distortion error.

6. The method of claim 5 wherein a new phase distortion compensated phase error signal is generated by subtracting the average phase distortion error from subsequent measurements of phase error between the AC line voltage and the internal timebase phase reference.

7. The method of claim 6 wherein the internal timebase phase reference is adjusted in response to the new phase distortion compensated phase error signal to reduce the phase distortion compensated phase error in subsequent cycles.

8. The method of claim 7 further including measuring a volt-time-area of the AC line voltage source by rectifying the AC line voltage source to create two positive half cycles and integrating the result for each half cycle of the internal timebase phase reference, providing four quadrants, Vq1, Vq2, Vq3, and Vq4 of volt-time-areas for each two cycles of the internal timebase phase reference.

9. The method of claim 8 wherein the four quadrants of volt-time-areas for each two cycles of the internal timebase phase reference are summed and multiplied by a constant to generate an estimated RMS value of the AC line voltage.

10. The method of claim 8 wherein estimating the phase error by dividing the difference between two adjacent quadrant volt-time-areas uses the fourth and first quadrants according to the equation $$\text{phase error} = \text{constant} \times [Vq1 - Vq4]/[Vq1 + Vq4].$$

11. The method of claim 10 wherein the phase error is estimated on a present cycle and the internal timebase phase reference is compensated on the next cycle of the AC line voltage.

12. A closed loop control for reducing a phase error between an AC line voltage source and an internal timebase phase reference which is used to generate a sequence of firing commands for a controller to switch the AC line voltage at predetermined phase angles to provide a phase angle controlled output, the closed loop control comprising:

A. a phase reference clock for generating the internal timebase phase reference at a nominal frequency of twice the AC line frequency;

B. an error estimator for generating an estimated phase error between the AC line voltage and the internal timebase phase reference;

C. a phase distortion compensator utilizing the estimated phase error for estimating phase distortion generated by switching the AC line voltage into an inductive load in the presence of line impedance; and D. a phase reference compensator for reducing the phase distortion compensated phase error between the internal timebase phase reference and the AC line voltage to synchronize the phase reference clock with the AC line frequency.

13. The closed loop control of claim 12 wherein the error estimator measures the AC line voltage prior to generating the sequence of firing commands to determine the phase error between the AC line voltage and the internal timebase phase reference and the phase reference compensator adjusts the phase reference clock in response to the phase error to synchronize the internal timebase phase reference and the AC line voltage.

14. The closed loop control of claim 13 wherein the synchronized phase reference clock operates without compensation for a predetermined number of cycles at initiation of the sequence of firing commands, and wherein the phase error is estimated to determine an average phase error due to phase distortion caused by the line impedance during the predetermined number of cycles.

15. The closed loop system of claim 14 wherein a new phase distortion compensated phase error signal is generated by subtracting the average phase distortion error from subsequent measurements of phase error between the AC line voltage and the internal timebase phase reference.

16. The closed loop control of claim 15 wherein the phase reference compensator uses the phase distortion compensated phase error signal for further reducing the phase distortion compensated phase error between the internal timebase phase reference and the AC line voltage.

17. The closed loop control of claim 16 wherein the phase reference compensator generates a time period for the phase reference clock based upon adjusting a nominal expected time period in response to the phase distortion compensated phase error, resulting in a new internal timebase phase reference.

18. The closed loop control of claim 17 wherein the resulting new internal timebase phase reference replaces the previous internal timebase phase reference in subsequent operations of the closed loop control.

19. The closed loop control of claim 18 wherein the phase distortion compensated phase error is estimated on a present cycle and is compensated on a next cycle of the AC line voltage.

* * * * *